Mar. 6, 1923. 1,447,813.
C. PATRICK.
FRYING PAN.
FILED MAR. 5, 1921.

Charles Patrick.
INVENTOR

WITNESS: John Babis, Jr.

BY Victor J. Evans
ATTORNEY

Patented Mar. 6, 1923.

1,447,813

UNITED STATES PATENT OFFICE.

CHARLES PATRICK, OF CHESTER, PENNSYLVANIA.

FRYING PAN.

Application filed March 5, 1921. Serial No. 449,976.

*To all whom it may concern:*

Be it known that I, CHARLES PATRICK, a citizen of the United States, residing at Chester, in the county of Delaware and State of Pennsylvania, have invented new and useful Improvements in Frying Pans, of which the following is a specification.

This invention relates to cooking utensils and more particularly to broiling pans of the type provided with integral grid portions adapted to support the food material in spaced relation with the bottom of the pan for preventing scorching or burning thereof while cooking.

An object of the invention is to provide a cooking utensil having a dome shaped base which constitutes a combined heat collecting chamber and grid.

Another object of the invention is to provide a concavo convex grid which will permit the juices and renderings from cooking material to flow outwardly over the grid for collecting at the edge thereof.

Another object of the invention is the provision of means associated with the grid for collecting the juices and renderings from food materials cooked thereon.

The above and other objects of my invention are obtained in the structure described in detail in the following specification and illustrated in the accompanying drawings, and wherein:—

Figure 1:
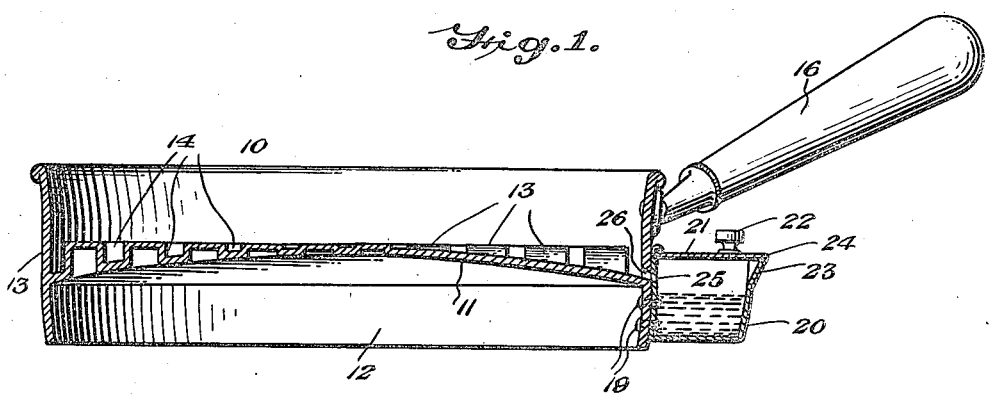
Figure 1 is a sectional view of the cooking utensil.
Figure 2:
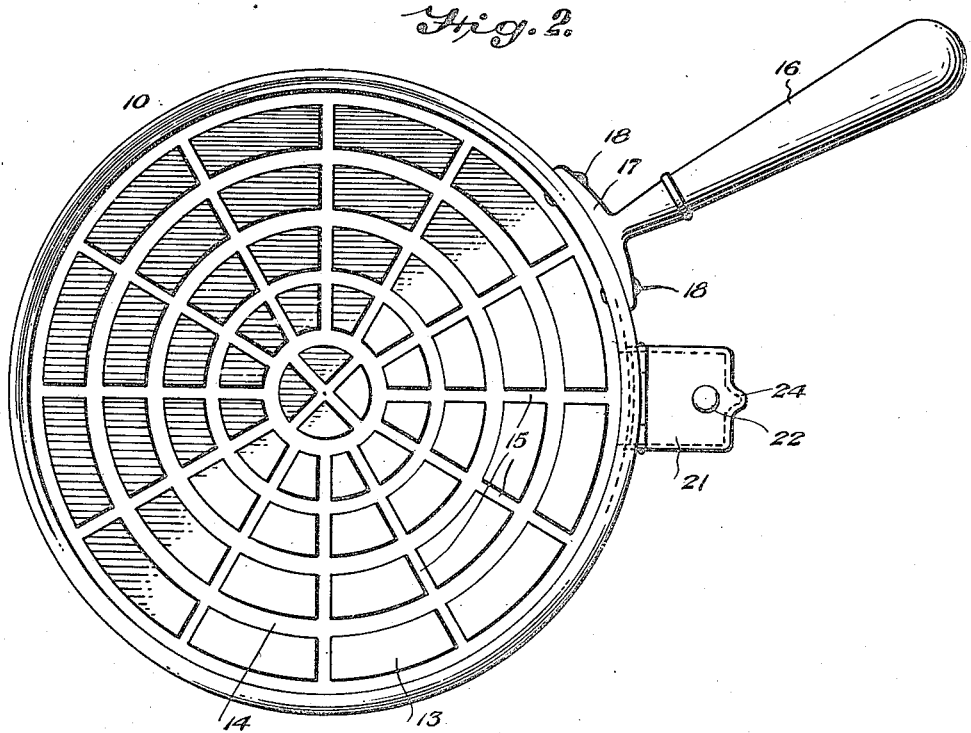
Figure 2 is a top plan view thereof.

Referring to the drawing the utensil comprises a receptacle designated broadly at 10, which may be stamped or molded as an integral structure. The receptacle 10 is provided with a concavo convex base 11, the outer edge of which terminates in a depending annular flange 12 forming part of the side wall 13 of the receptacle. The base 11 and flange 12 constitute a substantially dome shaped heat collecting and conserving chamber, and the base 11 is provided with a plurality of annular ribs 13 disposed in concentrically spaced relation to form a plurality of similarly disposed annular recesses 14. The ribs 13 and recesses 14 are divided into arcuate shaped equal sections respectively by radial disposed recesses 15 which extends outwardly from the center of the base 12 to the outermost annular recess 14. The radially disposed recesses 15 permit juices and renderings from food materials cooking on the grid or base 12 to flow outwardly over the concavo convex surface of the base for collection as will presently appear.

The receptacle 10 is provided with a handle 16 having at one end an integral flange 17 secured at 18 to the side wall 13 of the receptacle by rivets or other suitable fastening means. At one side of the handle 16 and secured to the side wall 13 by rivets 19 is a collecting pot 20, the collecting pot being provided with a hinged cover 21 having a knob 22. The collecting pot 20 is provided adjacent the outer edge thereof with a spout 23 which is normally covered by an outwardly extending lip portion 24 of the cover 21. The inner wall of the collecting pot 20 is provided with an opening 25 in alignment with an opening 26 in the side wall 13 of the receptacle. The openings 25 and 26 establish communication between the outermost annular recess 14 and the collecting pot 20, permitting juices and renderings from cooking materials on the base 11 to flow through said openings for collection within the receptacle 20. The upper faces of the ribs 13 lie in a plane which is parallel with the lower annular edge of the flange 12 to provide a level grid to thereby insure equal distribution of the collected heat within the dome shaped heat collecting and conserving chamber.

It will appear obvious that my invention is susceptible to various modifications within the scope of the following claims, and that this disclosure is by way of illustration only and is not to be taken as restrictive of my conception.

What I claim is:—

1. A grid having opposite sides formed with a lower generally concave surface and an upper convex surface with ribs the highest points of which lie in a single plane.

2. The combination with a cooking utensil having a handle and provided with a base having a lower generally concave surface and an upper convex surface with ribs the highest points of which lie in a single plane, of a receptacle carried by the utensil and disposed at one side of the handle, and a conduit establishing communication between said base and the receptacle.

3. The combination with a cooking utensil provided with a handle and having a base having a lower generally concave surface and an upper convex surface with ribs the highest points of which lie in a single plane, of a receptacle carried by the utensil and associated with said base, said receptacle being disposed at one side of the handle and having means adapted to normally close the same.

4. A cooking utensil having a base having a lower generally concave surface and an upper convex surface with ribs the highest points of which lie in a single plane, said base dividing the utensil to form a dome shaped heat collecting chamber.

5. As a new article of manufacture, a utensil comprising a food supporting element having a concavo-convex shape and formed with a plurality of concentric grooves and a plurality of intersecting radial grooves.

In testimony whereof I affix my signature.

CHARLES PATRICK.